United States Patent [19]

Udipi et al.

[11] 4,051,199

[45] Sept. 27, 1977

[54] EPOXIDIZED COPOLYMERS OF STYRENE, BUTADIENE AND ISOPRENE

[75] Inventors: Kishore Udipi; Henry L. Hsieh, both of Bartlesville, Okla.

[73] Assignee: Phillips Petroleum Company, Bartlesville, Okla.

[21] Appl. No.: 663,892

[22] Filed: Mar. 4, 1976

[51] Int. Cl.$^2$ .................. C08F 257/02; C08F 279/02; C08F 297/04
[52] U.S. Cl. ............................ 260/880 R; 260/880 B; 526/56; 526/57
[58] Field of Search .................. 260/880 B, 880 R; 526/56, 57

[56] References Cited

U.S. PATENT DOCUMENTS

| | | | |
|---|---|---|---|
| 3,022,322 | 2/1962 | Wheelock et al. | 260/348.5 |
| 3,555,112 | 1/1971 | Winkler | 260/836 |
| 3,853,978 | 12/1974 | Horiie et al. | 260/880 B X |
| 3,872,068 | 3/1975 | Horiie et al. | 260/880 B X |

*Primary Examiner*—William F. Hamrock

[57] ABSTRACT

Epoxidized polymers having the structure S-D/S-S or D/S-S-D/S-S in which S represents a polystyrene block and D/S represents a tapered block of styrene and butadiene and/or isoprene, with the further provision that 5–95% of the olefinic unsaturation of the polymer has been epoxidized, exhibit good oil and ozone resistance.

12 Claims, No Drawings

EPOXIDIZED COPOLYMERS OF STYRENE, BUTADIENE AND ISOPRENE

The present invention relates to novel block copolymers. More specifically the present invention relates to novel epoxidized block copolymers of butadiene or isoprene with styrene. In one of its more specific aspects, the present invention relates to thermoplastic elastomers. Another aspect of this invention relates to a process for making epoxidized thermoplastic elastomers.

BACKGROUND OF THE INVENTION

Various kinds of rubbery polymers have synthetically been produced. Among these polymers the plastomers or thermoplastic elastomers are of particular interest. These thermoplastic elastomers are synthetic rubbers of block copolymer structure having terminal blocks of various nearby molecules to establish resinous domains that serve as junctions in a network otherwise containing rubbery blocks. The resinous domain junctions or physical crosslinks form automatically upon synthesis of the block copolymer. The rubber thus produced exhibits substantial tensile strength in the absence of a chemical curing process. The domains of the end blocks just mentioned soften upon heating so that it is possible to form this rubber into the desired shapes by way of techniques known for the forming of thermoplastic articles.

The utilitarian values of these thermoplastic elastomers are inherently restricted by their susceptibility to attack by substances such as oil and ozone. The thermoplastic elastomers when fabricated into articles such as hoses, gaskets, motor mounts, and the like, are subject to weakening and dimensional distortion when they are contacted with fuels and lubricants during their use in automotive and aircraft applications, for instance.

The Invention

It is thus one object of this invention to provide novel copolymers. Another object of this invention is to provide novel copolymers of styrene and butadiene and/or isoprene.

A further object of this invention is to provide such polymers which exhibit good resistance towards swelling by hydrocarbon agents and good resistance against ozone degradation.

Still another object of this invention is to provide a process for the production of these novel copolymers.

These and other objects, advantages, features, details and embodiments of this invention will become apparent to those skilled in the art from the following description of preferred embodiments of this invention, the examples and the appended claims.

In accordance with this invention, we have now found that polymers having the structural formula S-D/S-S or D/S-S-D/S-S, in which S is a polystyrene block and D/S is a tapered block copolymer of styrene and butadiene and/or isoprene, with the further provision that 5-95% of the olefinic unsaturation of these polymers is removed by epoxidation, exhibit good resistance towards oil, towards swelling by hydrocarbon agents, and toward ozone degradation. A tapered block copolymer is definitive for a copolymer block in which units derived from butadiene and/or isoprene (alkadiene units) on the one hand and units derived from styrene (styrene units) on the other hand, are distributed over a linear polymer chain in such a manner that one end of this polymer chain is rich in alkadiene units and the other end is rich in styrene units and that proceeding along the polymer chain from the alkadiene rich end towards the styrene rich end, the polymer composition becomes continuously enriched in styrene units and likewise proceeding along the polymer chain from the styrene rich end towards the alkadiene rich end the polymer composition becomes continuously enriched in alkadiene units.

The expression epoxidation refers to a procedure by which olefinic unsaturation in a polymer are converted into oxirane groups. During this process other oxygen containing groups characteristic of the reaction medium are also formed on the polymer. Examples for such oxygen containing groups are hydroxy, acetoxy and formyloxy groups.

In the above formula, the units D/S-S have to be understood in the following sense: the unit D/S-S is a polymer unit and a portion of the abovedefined polymers that consists of a tapered copolymer of styrene and butadiene and/or isoprene. This tapered copolymer ends with a polystyrene block. This polystyrene block S of this unit is either the result of a simultaneous polymerization of the alkadiene with the styrene in the absence of randomizing agents, or this polystyrene block is generated separately after the forming of the tapered copolymer section D/S by an additional addition of a styrene charge to the polymerization. In each of the formulae above, the styrene-rich end of the tapered block section D/S is connected to one polystyrene block S.

Among the two copolymer types as defined above, the epoxidized copolymer having the structure S-D/S-S is the presently preferred copolymer. This thermoplastic elastomer exhibits both desirably high oil resistance and good ozone resistance.

In the following description of further embodiments of this invention, the term alkadiene is used in order to describe butadiene, or isoprene, or mixtures of butadiene and isoprene.

The monomer ratio in the units D/S-S, two of which are present in the tetrablock copolymer defined above, and one of which is present in the triblock copolymer defined above, can be varied in broad ranges. The usually employed weight ratios of styrene to alkadiene in these units are shown in the following table.

TABLE I

| Weight Ratio of Styrene to Alkadiene in the D/S-S Units | |
|---|---|
| Usually employed range | 85/15 to 15/85 |
| Preferred range | 75/25 to 25/75 |

The weight ratio of the polystyrene block S- to the unit D/S-S in the triblock copolymer as defined above can also be varied in broad ranges. Usually employed ranges for this weight ratio, as well as the preferred range for this weight ratio, are shown in the following table.

TABLE II

| Weight Ratio of the Unit D/S-S to the Unit S- of the Triblock Copolymer S-D/S-S | |
|---|---|
| Usually employed range | 90/10 to 50/50 |
| Preferred range | 80/20 to 60/40 |

In the tetrablock copolymer, the two units D/S-S can vary in their size. Ranges for the usually employed weight ratio of these two units D/S-S units, as well as a preferred range for this ratio, is shown in the following table.

TABLE III

| Weight Ratio of the First Unit D/S-S to the Second Unit D/S-S of the Tetrablock Copolymer D/S-S-D/S-S | |
|---|---|
| Usually employed range | 10/90 to 90/10 |
| Preferred range | 75/25 to 25/75 |

The weight average molecular weight of the polymers of this invention depends upon the intended use. Ranges for the generally employed molecular weight for the polymers of this invention, as well as a preferred range for this molecular weight, are shown in the following table.

TABLE IV

| Weight Average Molecular Weight of the Polymers | |
|---|---|
| Usually employed range | 30,000 – 250,000 |
| Preferred range | 60,000 – 180,000 |

Among the two alkadienes, butadiene is the presently preferred alkadiene monomer for the production of the parent polymer of this invention which is then epoxidized to form the preferred polymer of this invention. This preferred polymer has the structure polystyrene block-tapered butadiene/styrene copolymer block-polystyrene block, with the provision that 5–95%, preferably 20–50% of the butadiene unsaturations in the polymer have been removed by epoxidation.

Every butadiene molecule and every isoprene molecule introduces one olefinic unsaturation into the original polymer from which the polymer of this invention is made by epoxidation. The degree of epoxidation is defined by percentage of butadiene and/or isoprene units in the original polymer which were epoxidized. This degree of the epoxidation of the polymer of this invention is determined by the following procedure:

Determination of styrene content: The styrene contact of the original polymer (non-epoxidized) in weight % is determined by standard ultraviolet analysis. From this result the weight % of alkadiene units in the polymer is calculated.

Determination of degree of epoxidation: For a butadiene-styrene-copolymer epoxidized in a hydrogen peroxide/acetic anhydride system, the degree of epoxidation is determined as follows: The percent oxirane oxygen is determined as disclosed by R. R. Jay, Anal. Chem. 36, 667–668 (1964). The total oxygen is then determined, e.g., by activation analysis. From these values the degree of epoxidation is determined in accordance with the formula:

$$\text{degree of epox.} = \frac{2.875 \text{ weight \% oxirane oxygen} + 1.125 \text{ weight \% total oxygen}}{\text{weight \% butadiene}}$$

The weight % butadiene is determined on the non-epoxidized polymer as explained above as the difference between 100 and the weight % styrene. For polymers containing isoprene units and for cases in which the epoxidation has been carried out in other media than hydrogen peroxide/acetic anhydride, the formula above will be adjusted to correspond to these features.

In accordance with a further embodiment of this invention, there is also provided a process for producing the polymers defined above. This process essentially consists of two phases. In the first phase, production of the original copolymer having the structure defined above, but being not epoxidized, is achieved. In the second phase, epoxidation of the original copolymer is carried out.

In order to produce the original copolymer having the structure S-D/S-S, a first charge of styrene is added to a monofunctional initiator system such as organolithium. After the styrene has completely polymerized, a second charge of styrene and butadiene and/or isoprene is added to the polymerization system and these monomers are simultaneously polymerized onto the polystyrene block already present in the system. In the absence of a randomizing agent or in the presence of only a small quantity of a randomizing agent thereby, a unit having the structure -D/S-S is connected to the polystyrene block S. Thus the triblock copolymer defined above is made. It is within the scope of this invention to add further styrene when this second charge has completely polymerized, such as to generate a particularly long polystyrene end block.

The tetrablock copolymer D/S-S-D/S-S is similarly produced in accordance with this invention. A first charge of styrene and butadiene and/or isoprene is added to the monofunctional initiator. On completion of the polymerization of this first charge, a polymer unit having the structure D/S-S- is formed. It is within the scope of this invention to add further styrene at the end of this polymerization of the first charge in order to produce a particularly long polystyrene unit S. Thereafter a second charge of styrene and butadiene and/or isoprene is added to the polymerization system and the monomers of this charge are polymerized onto the resulting polymer produced in the first step. On completion of this polymerization step, the resulting polymer has essentially the structure D/S-S-D/S-S. It is within the scope of this invention to add a charge of styrene at the end of the polymerization of the second mixed charge in order to produce a particularly long styrene block.

In the definition of the polymers above, as well as in the description of the original polymers, both the inorganic, (e.g., lithium) and the organic, (e.g., butyl) initiator portions have been omitted in order to simplify the description of the polymers. It is well known in the art that the polymers produced by the incremental monomer addition described contain an initiator radical at one end thereof. Since this initiator radical is very small compared to the overall polymer, it does not have any significant influence on the overall property of the polymer so that this radical is omitted in the definition and the discussion of the polymers of this invention.

Various initiators for the polymerization process provided above are known in the art. The presently preferred initiators are the organomonolithium initiators. These initiators have the general formula RLi, wherein R is a hydrocarbon radical selected from the group consisting of aliphatic, cycloaliphatic, and aromatic radicals containing 1 to about 20 carbon atoms. Examples of suitable organomonolithium initiators are methyllithium, isopropyllithium, n-butyllithium, t-octyllithium, secbutyllithium, n-dodecyllithium, n-eicosyllithium, phenyllithium, 1-naphthylithium, p-tolyllithium, 4-phenylbutyllithium, cyclohexyllithium, and 4-cyclohexylbutyllithium. The presently preferred organomonolithium initiator is n-butyllithium. The amount of organomonolithium initiator employed depends upon the desired molecular weight of the polymer. This amount is normally in the range of about 0.1 to 100 millimoles of organomonolithium initiator per 100 grams of monomer.

The process for the production of the parent polymer is carried out in the presence of a diluent. Examples for suitable diluents or solvents are paraffinic, cycloparaffinic and aromatic hydrocarbons, as well as mixtures thereof, such as n-hexane, n-heptane, 2,2,4-trimethylpentane, cyclohexane, benzene, toluene and the xylenes.

The polymerization to produce the original copolymer is generally carried out at temperatures in the range of 0°-200° C, preferably at a temperature between 30° C and 150° C. The pressure employed is such that the reactants remain essentially in the liquid or dissolved phase. The reaction time for the various polymerization steps depends upon the other process parameters and in particular upon the ratio of initiator to monomer charge. Usually the total polymerization time to produce the parent copolymers from which the epoxidized copolymers of this invention are made is between 10 seconds and 24 hours.

The polymerization should be carried out essentially in the absence of materials known to be detrimental to the initiator system. Such detrimental materials include carbon dioxide, oxygen and water. Therefore, it is generally desirable to remove air and moisture from the reaction vessel and to keep the initiator and the reactants free of the materials mentioned. The polymerization steps are generally carried out under a nitrogen surface.

Upon completion of the polymerization steps, the polymerization mixture is then treated to remove the lithium from the polymer and to recover the rubbery copolymers. This is conveniently done by steam stripping the diluent from the polymer. Another suitable method is to add an alcohol to the mixture so as to remove the lithium from the polymer and cause coagulation of the polymer. Thereafter the polymer is separated from the diluent by any suitable means such as decantation or filtration. Advantageously, an antioxidant such as 2,6-di-t-butyl-4-methylphenol is added to the polymer prior to the recovery of the polymer.

The epoxidation of the original polymer to obtain the novel thermoplastic polymers of this invention is carried out by contacting the isolated polymers with an epoxidizing agent. Examples for such epoxidizing agents are peracids, such as m-chloroperbenzoic acid and peracetic acid; hydrogen peroxide, preferably aqueous $H_2O_2$ in the presence of a carboxylic acid or carboxylic anhydride, such as formic acid, or acetic acid or acetic anhydride. The reaction can be carried out with or without a catalyst such as sulfuric acid or p-toluenesulfonic acid. It is also within the scope of this invention to carry out the epoxidation in the presence of a cationic exchange resin such as a sulfonated polystyrene resin. The use of the anhydride has the advantage of providing a higher concentration of the peracids by forming the peracid in situ. The epoxidation of the original copolymer is carried out in a solution of the polymer. Suitable solvents for the original polymer are benzene, toluene, the xylenes, cyclohexane, chlorobenzene and the like.

The process conditions for the epoxidation phase of the process of this invention can be varied in broad ranges. In the preferred case of using aqueous hydrogen peroxide, the $H_2O_2$ concentration in the aqueous hydrogen peroxide can vary from 5-99 weight %, preferably 25-50 weight %. The process conditions that are generally employed when using aqueous hydrogen peroxide and those that are preferred are shown in the following table:

TABLE V

| Epoxidation Parameters Using $H_2O_2$ | | |
|---|---|---|
| | Generally Employed | Preferred |
| Amount of 30 weight % aqueous $H_2O_2$ | 5-100 php | 25-60 php |
| Epoxidation temperature | 0-150° C | 25-80° C |
| Reaction time | 0.25-10 hrs. | 0.5-3 hrs. | php refers to parts by weight per hundred parts of original polymer.

The higher the reaction temperature of the epoxidation phase is, the shorter the necessary reaction time becomes.

After the epoxidation step, the epoxidized thermoplastic elastomers of this invention are readily isolated by filtering to remove insoluble solids or by adding dilute aqueous base to neutralize acid and/or soluble acidic materials. Then the polymers are coagulated in alcohol and the mixture is decanted to collect the coagulum. One or more redissolution and recoagulation cycles can be carried out in order to further separate contaminants from the polymer. An antioxidant can be included and solvent traces can be removed at reduced pressure. Steam stripping is an alternative to the coagulation in which the polymer produced can be separated and recovered.

Compounding ingredients such as fillers, dyes, pigments, softeners and reinforcing agents can be used in compounding the novel copolymers of this invention. These ingredients are employed in the usually employed concentrations.

The novel copolymers of this invention can be used in the fabrication of hoses, belting, extruded and molded goods for diverse applications including those in the building construction, automotive applications, medical and household article fields.

The invention will still be more fully understood from the following examples that illustrate the invention.

EXAMPLE I

A linear tetrablock butadiene-styrene copolymer D/S-S-D/S-S containing two diblock sequences D/S-S was produced in accordance with this example. Each one of these diblock sequences was made by combined butadiene/styrene monomer charges such as to form two tapered butadiene/styrene copolymer block units. The tetrablock polymer had one polystyrene end block, whereas the other end was a butadiene-rich end. The polymers were produced by adding the various ingredients shown in the following recipe in capped beverage bottles.

| RECIPE | | |
|---|---|---|
| Step 1 | phm[a] | mhm[b] |
| Cyclohexane | 390 | |
| Styrene | 20.5 | |
| 1,3-Butadiene | 13.6 | |
| sec-Butyllithium | | 1.9 |
| Polymerization temperature, ° C | 70 | |
| Polymerization time, min. | 45 | |
| Step 2 | | |
| Cyclohexane[c] | 390 | |
| Styrene | 23 | |
| 1,3-Butadiene | 42.8 | |
| Polymerization temperature, ° C | 70 | |
| Polymerization | 45 | |

-continued

| RECIPE | | |
|---|---|---|
| Step 1 | phm[a] | mhm[b] |
| time, min. | | |

[a]Parts by weight per hundred parts of monomer.
[b]Gram millimoles per hundred grams of monomer.
[c]Previously scavenged by tumbling for 10 minutes at 70° C with n-butyllithium (0.16 mmole). This and the other Step Two recipe ingredients were added to the polymerlithium from Step One to resume polymerization.

The resulting polymer was isolated by addition of one part by weight per hundred parts by weight of rubber of 2,6-di-t-butyl-4-methylphenol in a 1:1 volume ratio toluene-isopropyl alcohol solution followed by coagulation in isopropyl alcohol. The coagulum was collected by decantation with removal of traces of solvent at 60° C under reduced pressure. The recovered copolymer was analyzed and the results of this analysis are shown in the following table:

| | |
|---|---|
| Styrene content, wt. %[a] | 46.4 |
| $M_w$[b] | 80,000 |
| $M_n$[b] | 68,000 |
| I.V.[c] | 0.63 |
| Gel, wt. %[d] | 0.0 |

[a]Determined by ultraviolet spectroscopy.
[b]Weight average molecular weight, $M_w$, and number average molecular weight, $M_n$, were determined by gel permeation chromatography in accordance with the method of G. Kraus and C. J. Stacy, J. Poly. Sci. Symposium No. 43, 329-343 (1973).
[c]Inherent viscosity was determined in accordance with U.S. 3,278,508, column 20, note a with the modification that the solution was not filtered through a sulfur absorption tube but rather a sample of the solution was filtered through a fritted glass filter stick of grade C porosity and pressured directly into the viscometer.
[d]The gel content of the polymer was determined in weight percent in accordance with U.S. 3,278,508, column 20, note (b).

EXAMPLE II

In this example a linear triblock butadiene-styrene copolymer S-D/S-S containing a first styrene block followed by a diblock sequence D/S-S was produced. The styrene was polymerized in a first step and styrene and butadiene were added to the living polymer of the first step such as to be polymerized onto the polymerization product of the first step. The quantities used are shown in the following recipe. The polymerization was carried out in capped beverage bottles under nitrogen atmosphere.

| RECIPE | | |
|---|---|---|
| Step 1 | phm | mhm |
| Cyclohexane | 390 | |
| Styrene | 21.2 | |
| sec-Butyllithium | | 2.1 |
| Polymerization temperature, ° C | 70 | |
| Polymerization time, min. | 45 | |
| Step 2 | | |
| Cyclohexane[a] | 390 | |
| Styrene | 27.6 | |
| 1,3-Butadiene | 51.2 | |
| Polymerization temperature, ° C | 70 | |
| Polymerization time, min. | 45 | |

[a]Previously scavenged by tumbling for 10 minutes at 70° C with n-butyllithium (0.16 mmole). This and other Step Two recipe ingredients were added to the polymerlithium from Step One to resume polymerization.

The resulting polymer was isolated following the procedure described in Example I. The isolated copolymer was tested and the results for this polymer are as follows:

| | |
|---|---|
| Styrene content, wt. % | 51.7 |
| $M_w$ | 63,000 |
| $M_n$ | 53,000 |
| I.V. | 0.55 |
| Gel, wt. % | 0.0 |

EXAMPLE III

Portions of the polymers produced in Examples I and II were epoxidized in accordance with the following procedure. The quantities of reagents employed are shown in the following recipe and correspondingly in the following table. The ion exchange resin was added to a stirred solution of the polymer in toluene maintained at 70° C. Thereafter the acetic anhydride was added to the stirred solution. Then hydrogen peroxide was added dropwise to the polymer solution while stirring was continued. The mixture was then maintained at 70° C for 3 hours while stirring was continued.

| RECIPE | |
|---|---|
| | php[a] |
| Polymer | 100 |
| Toluene | 866 |
| Dowex 50W-X8[b] | 23 |
| Acetic anhydride | variable[c] |
| Hydrogen peroxide, 30% | variable[c] |
| Temperature, ° C | 70 |
| Time, hrs. | 3 |

[a]Parts by weight per hundred of polymer.
[b]A strongly acidic cation exchange resin, Dow Chemical Co.
[c]See Table VI.

The epoxidized polymers were coagulated in isopropyl alcohol. The coagulated polymers were purified by recoagulating them twice in isopropyl alcohol from a toluene solution. Prior to the final coagulation, one part by weight per hundred parts by weight of polymer of the antioxidant 2,6-di-t-butyl-4-methylphenol was added as a 10 weight percent solution in a 1:1 volume ratio mixture of isopropyl alcohol and toluene. Volatiles were removed from the coagulated epoxidized copolymer at 50° C and under reduced pressure.

The recovered polymer was evaluated in accordance with various test procedures and the results obtained are shown in the following table.

TABLE VI

| | Polymer of Example I | | | Polymer of Example II | | |
|---|---|---|---|---|---|---|
| | Not Epoxidized | Epoxidized | | Not Epoxidized | Epoxidized | |
| Acetic anhydride, php | 0 | 6.25 | 12.5 | 0 | 6.25 | 12.5 |
| Hydrogen peroxide, php | 0 | 28 | 56 | 0 | 28 | 56 |
| Oxirane, wt. %[a] | 0 | 3.37 | 4.72 | 0 | 2.79 | 4.55 |
| Oxygen, wt. %[b] | —[c] | 5.12 | 7.98 | —[c] | 5.98 | 7.54 |
| Degree of Epoxidation[a] | | 28.8 | 42.1 | | 30.6 | 44.6 |
| Melt flow[d] | 94.3 | —[e] | 185 | —[e] | —[f] | 182.6 |
| 200% Modulus, psi[g] | 300 | 180 | 170 | 800 | 370 | 380 |
| 300% Modulus, psi[g] | 300 | 200 | 170 | 800 | 400 | 420 |

TABLE VI-continued

|  | | Polymer of Example I | | | Polymer of Example II | |
| --- | --- | --- | --- | --- | --- | --- |
|  | | Not Epoxidized | Epoxidized | | Not Epoxidized | Epoxidized | |
| Tensile, psi[g] | | 1630 | 1320 | 1780 | 4950 | 4810 | 4110 |
| Elongation, %[g] | | 1000 | 1000 +[h] | 1000 +[h] | 690 | 730 | 670 |
| Shore A hardness | | 82 | 63 | 61 | 90 | 86 | 84 |
| Percentage swell in ASTM oil No. 3; 7 da. at approx. 27° C[i] | | —[j] | —[j] | —[j] | —[j] | 45 | 14 |
| Tensile of swollen samples, psi[g] | | | | | | 200 | 2820 |
| Elongation of swollen samples, psi[g] | | | | | | 800 | 750 |
| Ozone Resistance | | | | | | | |
| Bent loop[k] | 1 day | 0 | 0[l] | 0[l] | x | 0 | 0 |
| | 7 days | 0 | 0[l] | 0[l] | x | 0 | 0 |
| 10% Elongated sample[m], | 1 day | 10 | 0[l] | 0[l] | x | 0 | 0 |
| | 7 days | x | 0[l] | 0[l] | x | 0 | 0 | a. Weight in grams of oxirane oxygen per 100 grams of epoxidized polymer, R. R. Jay, Anal. Chem. 36 667–668 (1964).
b. Determined by activation analysis.
c. Parent polymers did not contain oxygen.
d. ASTM D 1238 modified (g/10 min. at 180° C/21.6 kg).
e. Exceeds limit of test, excessively fluid.
f. Insufficent stock for determination.
g. ASTM D 412-66.
h. Extent of elongation exceeded limit of test.
i. Weight percentage increase in sample upon exposure to ASTM Oil No. 3 in accordance with ASTM D 471-668
j. Sample dissolved.
k. Specimens 5 in. by 0.5 in. by 0.08 in. were clamped in bent loop shape such that specimen ends were face to face while exposed to 50 parts ozone per hundred million air at 40° C. Samples were examined for cracks, 0 denotes none, x denotes sample broke, 10 denotes crack of length approx. 0.15 inches.
l. Samples drooped, no stress, were too soft to form bent loops.
m. Samples were clamped linearly in position of 10% elongation and exposed to 50 parts ozone per million air at 40° C.
n. Weight percent of total butadiene units in polymer which were epoxidized.

a. Weight in grams of oxirane oxygen per 100 grams of epoxidized polymer, R. R. Jay, Anal. Chem. 36 667–668 (1964).
b. Determined by activation analysis.
c. Parent polymers did not contain oxygen.
d. ASTM D 1238 modified (g/10 min. at 180° C/21.6 kg).
e. Exceeds limit of test, excessively fluid.
f. Insufficient stock for determination.
g. ASTM D 412-66.
h. Extent of elongation exceeded limit of test.
i. Weight percentage increase in sample upon exposure to ASTM Oil No. 3 in accordance wth ASTM D 471-72.
j. Sample dissolved.
k. Specimens 5 in. by 0.5 in. by 0.08 in. were clamped in bent loop shape such that specimen ends were face to face while exposed to 50 parts ozone per hundred million air at 40° C. Samples were examined for cracks, 0 denotes none, x denotes sample broke, 10 denotes crack of length approx. 0.15 inches.
l. Samples drooped, no stress, were too soft to form bent loops.
m. Samples were clamped linearly in position of 10% elongation and exposed to 50 parts ozone per million air at 40° C.
n. Weight percent of total butadiene units in polymer which were expoxidized.

The results of this table show that the epoxidized copolymers of this invention have a markedly improved ozone resistance. Furthermore, the results show that surprisingly the triblock copolymer having the structure S-D/S-S has a considerably better oil resistance than the tetrablock copolymer D/S-S-D/S-S.

Reasonable variations and modifications, which will become apparent to those skilled in the art can be made in this invention without departing from the spirit and scope thereof.

We claim:

1. As a composition of matter, a polymer defined by the formula

S-D/S-S in which S is a polystyrene block, D/S is a tapered copolymer block of styrene and an alkadiene selected from the group consisting of butadiene and isoprene having an alkadiene-rich end and a styrene-rich end of which the styrene-rich end is attached to one block S, with the further provision that 5–95% olefinic unsaturations in the D/S blocks have been removed by epoxidation.

2. A composition in accordance with claim 1 having the structure polystyrene block-tapered butadiene/styrene copolymer block-polystyrene block.

3. A composition in accordance with claim 1 wherein about 20 to about 50% of the olefinic unsaturations have been removed by epoxidation.

4. A composition in accordance with claim 1 having a weight average molecular weight of 30,000–250,000.

5. A composition in accordance with claim 1 formula (1) in which the weight ratio of the unit D/S-S to the block S is within the range of 90/10 to 50/50.

6. A composition in accordance with claim 1 wherein the overall weight ratio of styrene to alkadiene is within the range of 75/25 to 25/75.

7. A process for producing an epoxidized copolymer comprising a. contacting alopolymer defined by the formula

S-D/S-S in which S is a polystyrene block, D/S is a tapered copolymer block of styrene and an alkadiene selected from the group consisting of butadiene and isoprene having an alkadiene-rich end and a styrene-rich end of which the styrene-rich end is attached to one block S, with an epoxidizing agent such as to remove 5–95% of the olefinic unsaturation of the tapered blocks D/S and b. recovering the epoxidized copolymer.

8. A process in accordance with claim 7 wherein said epoxidizing agent is selected from the group consisting of
   a. peracids, and
   b. hydrogen peroxide and carboxylic acids or anhydrides.

9. A process in accordance with claim 8 wherein the epoxidizing agent comprises aqueous hydrogen peroxide and acetic anhydride.

10. A process in accordance with claim 7 wherein said epoxidizing agent additionally comprises an acid catalyst selected from the group consisting of sulfuric acid and p-toluenesulfonic acid.

11. A process in accordance with claim 8 for producing a copolymer having the formula S-D/S-S comprising
   a. introducing a first charge of styrene to an organomonolithium initiator-diluent system and polymerizing said styrene until the entire first charge has been polymerized, forming a polystyrene block;
   b. adding a second charge of styrene and an alkadiene selected from the group consisting of butadiene, isoprene and mixtures thereof to the polymerization mixture obtained in step a, and polymerizing same onto the polystyrene block obtained in step a, until the entire charge has been polymerized to form a tapered alkadiene-styrene-copolymer block connected by its alkadiene rich end to the polystyrene block and to form a polystyrene end block at the end of the polymerization step b,
   c. epoxidizing 5-95% of the olefinic unsaturation of the polymer produced in step b by contacting the polymer produced in step b with an epoxidizing agent and thereafter.
   d. recovering the resulting epoxidized polymer.

12. A process in accordance with claim 11 wherein said initiator is a butyllithium initiator and said diluent is selected from the group consisting of n-hexane, n-heptane, 2,2,4-trimethylpentane, cyclohexane, benzene, toluene, and the xylenes.

* * * * *

UNITED STATES PATENT AND TRADEMARK OFFICE
CERTIFICATE OF CORRECTION

PATENT NO. : 4,051,199
DATED : September 27, 1977
INVENTOR(S) : Kishore Udipi et al It is certified that error appears in the above-identified patent and that said Letters Patent are hereby corrected as shown below:

Column 10, line 57, "alopolymer" should read --- a copolymer ---; column 11, line 15, "8" should read --- 7 ---.

Signed and Sealed this

Seventh Day of March 1978

[SEAL]

Attest:

RUTH C. MASON
Attesting Officer

LUTRELLE F. PARKER
Acting Commissioner of Patents and Trademarks